A. C. Crondal.

Hats & Caps.

No. 2150 Reissued Jan. 23, 1866.

Witnesses

James P. Stall

Wm F. McNamara

Inventor

A. Lourlander Crondal

UNITED STATES PATENT OFFICE.

A. COURLANDER CRONDAL, OF NEW YORK, N. Y.

IMPROVEMENT IN CORK HATS.

Specification forming part of Letters Patent No. 44,941, dated November 8, 1864; Reissue No. 2,150, dated January 23, 1866.

*To all whom it may concern:*

Be it known that I, A. COURLANDER CRONDAL, of the city, county, and State of New York, have invented a new and Improved Covering for the Head; and I do hereby declare that the following is a full, clear, and exact description thereof, which will enable those skilled in the art to make and use the same, reference being had to the accompanying drawings, forming part of this specification, in which—

Figure 1:
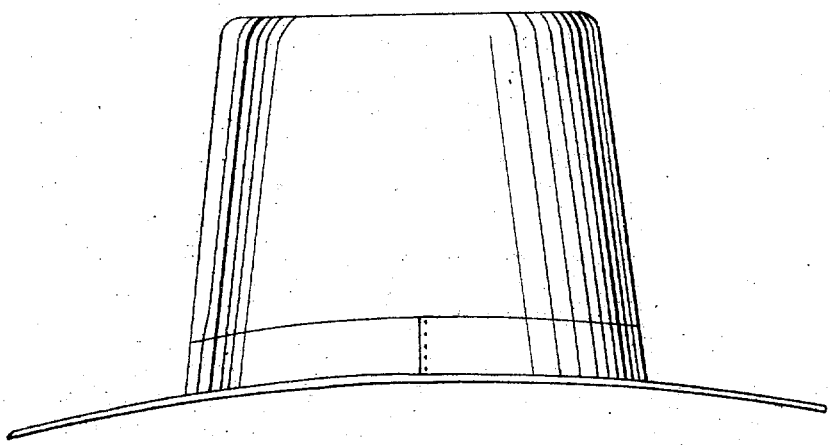
Figure 3:
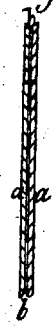
Figure 2:
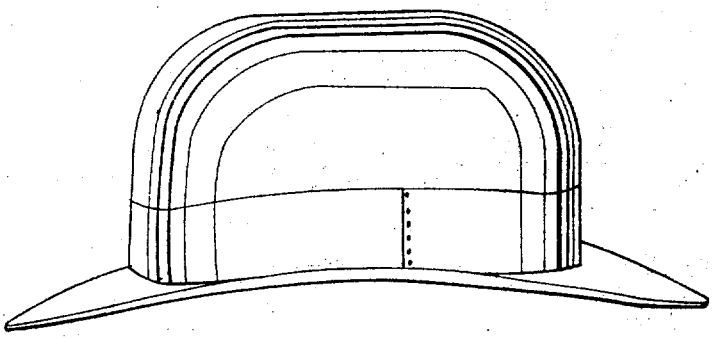

Figure 1 represents a side elevation of a cork hat constructed according to this invention. Fig. 2 is a perspective view of a modification of the same. Fig. 3 is a transverse vertical section of one of its sides.

Similar letters of reference indicate like parts.

This invention consists of a covering for the head, made of one or more layers of cork, which are prepared in any suitable manner, and pasted or otherwise connected to one or more layers of canvas, muslin, or other textile or flexible material in such a manner that a hat is produced which is durable, elastic, and impervious to water and to the rays of the sun.

The cork is first cut up in slices of the requisite thickness by means of suitable machinery, and it is then prepared in any suitable manner to render the same soft, pliable, and elastic. After the cork has been thus prepared with oil, or steam, or other means, I take the sheet *a* and paste it to a sheet, *b*, of canvas or other textile or flexible material by suitable cement, using, by preference, cement made from gutta-percha or other material impervious to water, and thereby a material is obtained which can be worked into a hat of any desirable form or shape. If desired, an additional layer of cork may be applied.

A hat produced according to this invention is impervious to water and to the sun's rays, it is light and agreeable to wear, and, if desired, it can be covered with any suitable textile or other material.

Although hats alone are named in the foregoing parts of this specification, in conformity with technical exactness with respect to the unity of the subject-matter of a patent, it is obvious that any article of apparel for the head must fall within the scope of the invention in which I desire to be protected.

I do not claim, broadly, as my invention the use of cork in the manufacture of hats; but

What I claim as new, and desire to secure by Letters Patent, is—

Manufacturing coverings for the head of sheets composed of one or more layers of cork and one or more layers of canvas, muslin, or other textile or flexible material, substantially as herein set forth.

A. COURLANDER CRONDAL.

Witnesses:
M. M. LIVINGSTON,
C. L. TOPLIFF.